United States Patent [19]

Harries

[11] 3,769,801

[45] Nov. 6, 1973

[54] MASTER CYLINDER ASSEMBLIES FOR HYDRAULIC BRAKING SYSTEMS

[75] Inventor: David Anthony Harries, Solihull, England

[73] Assignee: Girling, Limited, Birmingham, England

[22] Filed: Sept. 16, 1970

[21] Appl. No.: 72,769

[30] Foreign Application Priority Data
Sept. 6, 1969  Great Britain.................. 45,563/69

[52] U.S. Cl. ................................................. 60/547
[51] Int. Cl. ............................................ F15b 7/00
[58] Field of Search ...................... 60/54.5, 54.6 P; 91/422, 399, 416; 92/181, 183

[56] References Cited
UNITED STATES PATENTS

| | | | |
|---|---|---|---|
| 3,064,431 | 11/1962 | Schnell ............................ | 60/54.6 P |
| 2,410,176 | 10/1946 | Magrum............................ | 188/269 |
| 2,957,311 | 10/1960 | Stelzer............................. | 60/54.6 P |
| 3,074,383 | 1/1963 | Schultz............................. | 60/54.6 P |
| 3,106,874 | 10/1963 | Schultz............................. | 60/54.6 P |
| 3,159,974 | 12/1964 | Rodgers............................ | 60/54.6 P |
| 3,557,555 | 1/1971 | Wilson et al. ..................... | 60/54.6 E |
| 3,306,043 | 2/1967 | Kellogg et al. ................... | 60/54.5 P |
| 3,253,409 | 5/1966 | Kellogg et al. ................... | 60/54.6 P |

Primary Examiner—Martin P. Schwadron
Assistant Examiner—A. M. Zupcic
Attorney—Imirie & Smiley

[57] ABSTRACT

A master cylinder assembly for an hydraulic braking system comprises an hydrostatic master cylinder in combination with a power operated master cylinder. The hydrostatic master cylinder has a piston working in a bore with a first pressure space between said piston and a closed end of the bore. The power operated master cylinder has a pedal-operated piston working in a bore in which there is a second pressure space. Fluid under pressure from a high pressure source can be admitted to the second pressure space through a normally closed valve which is in communication with the second pressure space and is operable upon operation of the pedal operated piston. High pressure fluid in the second pressure space can act on the piston of the hydrostatic master cylinder either directly or through a secondary piston in the bore of the power operated master cylinder. Thus the piston of the hydrostatic master cylinder is advanced in the bore of the hydrostatic master cylinder to pressurise fluid in the first pressure space and fluid from the first pressure space can be supplied to the brakes of a braking circuit of a vehicle.

7 Claims, 2 Drawing Figures

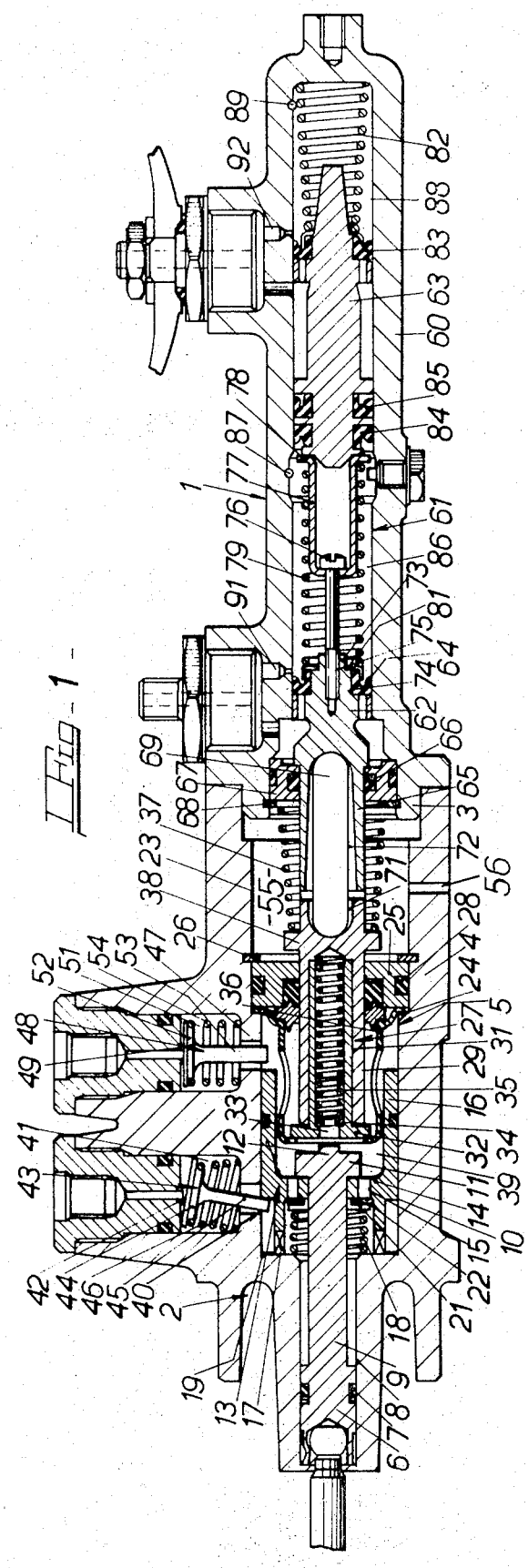

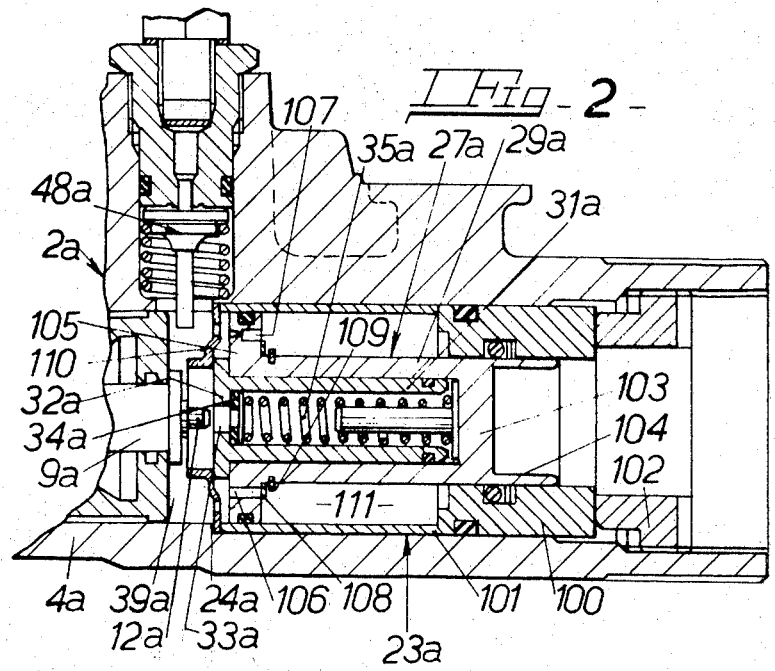

MASTER CYLINDER ASSEMBLIES FOR HYDRAULIC BRAKING SYSTEMS

SPECIFIC DESCRIPTION

This invention relates to master cylinder assemblies for hydraulic braking systems.

According to our invention in a master cylinder assembly for an hydraulic braking system comprising a first master cylinder including a piston working in a bore in the cylinder body in combination with a second master cylinder including a pressure space to which fluid under pressure is adapted to be supplied from a high pressure source through a normally closed valve which is adapted to be opened upon operation of a pedal-operated piston working in a bore in the second master cylinder, high pressure fluid in the pressure space of the second master cylinder acts on the piston of the first master cylinder to advance that piston in the bore of the first master cylinder and pressurise fluid in a pressure space in front of that piston from whence fluid under pressure can be supplied to the brakes of a braking circuit of a vehicle.

In an inoperative or retracted position the pressure space of the first master cylinder is supplied with fluid from an hydrostatic reservoir through a normally open valve or passage means which is closed automatically when the piston is advanced in the cylinder bore under the effect of high pressure fluid in the pressure space of the second master cylinder. The pressure space of the second master cylinder is in communication through a normally open valve with a return line to a reservoir for the high pressure source. The valve controlling communication with the return line is closed to cut off communication with the reservoir when the pedal-operated piston is advanced in the bore of the second master cylinder to effect opening of the valve controlling communication betwen the pressure space in the second master cylinder and the high pressure source.

The high pressure fluid in the pressure space of the second master cylinder may act directly on the piston of the first master cylinder or it may act on an intermediate or secondary piston working in a bore in the second master cylinder which acts on the piston of the first master cylinder through a thrust member or strut. The thrust member or strut may be received at opposite ends in opposed recesses in adjacent ends of these pistons or it may be integral with one of the pistons and engaging with the other piston. Alternatively the thrust member may be fixedly connected to one piston and engaging with the other piston.

The invention will now be more particularly described with reference to and as illustrated in the accompanying drawings in which:

FIG. 1 is a longitudinal section through a master cylinder assembly in accordance with the invention; and FIG. 2 is a longitudinal section through part of a power-operated master cylinder incorporated in the assembly illustrated in FIG. 1, but showing a modification.

In the assembly illustrated in FIG. 1, 1 is a hydrostatic tandem master cylinder and 2 is a power-operated master cylinder. The master cylinders 1 and 2 are connected at adjacent ends by suitable detachable securing means, for example bolts (not shown), a spigot portion extension 3 at the inner end of the body of the master cylinder 1 being received within the adjacent end of the body 4 of the master cylinder 2.

The body 4 of the master cylinder 2 is provided with a stepped longitudinal bore 5. A first piston 6 provided with a seal 7 works in the portion 8 of the bore 5 of smaller diameter and is provided with an axial extension 9 in the form of an imperforate rod. The rod 9 extends into the portion 10 of the bore of greater diameter and terminates at its inner end in a headed portion 11 having a forwardly extending central nose portion 12 of reduced diameter.

A cage assembly 13 slidably mounted on the imperforate rod 9 includes a radial flange 14 provided with a plurality of ports 15 and an annular shroud 16 extending axially in opposite directions with respect to the flange 14 and working in the bore 5. A plurality of ports 17 are also provided in the outer end of the shroud. The inner face of the flange 14 is held in abutment with the head 11 on the rod 9 by a compression spring 18 acting between a step 19 at the change in diameter of the bore 5 and the flange 14 of the cage assembly 13. Interposed between the spring 18 and the flange 14 there are a washer 21 and an annular valve closure member 22 adapted to seat the flange 14 covering the ports 15 to restrict fluid flow through the flange 14 and thereby damp movement of the cage assembly 13. This damper construction is more fully described in our co-pending application No. 28297/68.

The portion 10 of the stepped bore 5 is counterbored at 23 from its outer end and a shoulder 24 at the step in diameter forms an abutment for an annular ring 25 held in position by a circlip 26.

A secondary piston 27 in the form of a telescopic assembly is slidably received in a central opening in the ring 25 provided with a seal 28. The secondary piston assembly 27 comprises an outer piston 29 in the form of a hollow sleeve which is closed at its forward end and in which works an inner piston 31 projecting from the piston 29. The inner piston 31 is hollow, being provided at its outer end with an end closure flange 32 having a central opening 33 aligned with, and of a diameter slightly greater than that of the nose portion 12 at the inner end of the rod 9. An annular sealing ring 34 is held against the inner face of the flange 32, a compression spring 35 acting between the ring 34 and the closed inner end of the piston 29 to urge the pistons 31 and 29 in opposite directions away from each other. Movement of the pistons relatively away from each other is normally prevented by a rigid clip 36 of generally top hat section engaging with the inner piston 31 and clamped between the ring 25 and the step 24, and a compression return spring 37 urging the outer piston 29 towards the piston 6 and acting on a flange 38 at the forward end of the outer piston 29.

A pressure space 39 is located in the bore of the body 2 between the first piston 6 and the secondary piston assembly 27. Communication between the pressure space 39 and a reservoir is established, in the off position of brake, through a port 40 in the wall of the cylinder body 2 leading into a chamber 41 in which is mounted a valve seat 42 controlled by a tilting valve 43. The valve 43 comprises a head 44 having an upper face adapted to engage with the valve seat 42. The head is mounted on a stem 45 which is urged upwardly by a spring 46 located between the head 44 and the wall of the chamber 41 surrounding the port. The lower end of the stem 45 extends downwardly through the port 40 into the path of the outer free end of the shroud 16 of the cage assembly 13. When the main piston 6 and the imperforate rod 9 are in their fully retracted positions as illustrated, the shroud 16 engages with the lower end of the valve stem 45 and holds the valve 43 in a tilted position so that the pressure space 39 is in communication with the reservoir by way of the ports 15 in the flange 14 and the ports 17 in the outer end of the shroud.

Communication between the pressure space 39 and a source of high pressure fluid, such as a pump or hydraulic accumulator, through a further port 47 in the wall of the cylinder body, is controlled by a further tilting valve 48 co-operating with a valve seat 49 in a chamber 51 with which the port 47 communicates. The valve 48 comprises a head 52 having an upper face adapted to engage with the valve seat 49. The head 52 is mounted on a stem 53 which is urged upwardly by a spring 54 located between the head 52 and the wall of the chamber surrounding the port. The lower end of the stem 53 extends downwardly through the port 47 into the path of the inner free end of the shroud 16 of the cage assembly 13 and when the main piston 6 and the imperforate rod 9 are in their fully retracted positions, the shroud 16 is spaced by a short distance from the stem 53 so that, due to the force in the spring 54, the head 52 is urged against the valve seat 49 to prevent fluid under pressure being supplied to the pressure space 39 from the hydraulic supply.

The reservoir and the hydraulic accumulator or pump, which comprises the source of fluid under pressure, provide a closed circuit connected at opposite ends between the ports in the wall of the cylinder body controlled by the tilting valves. A non-return valve is located in the line between the hydraulic accumulator or pump and the tilting valve 48 to prevent the return of hydraulic fluid from the pressure space 39 to the hydraulic accumulator or pump when the tilting valve 48 is open.

The body 60 of the hydrostatic tandem master cylinder 1 is provided with a longitudinally extending bore 61 which is closed at its inner end and in which works a main piston 62 of the overhung type and floating piston 63 located between the main piston 62 and the closed end of the bore. The main piston 62 carries a seal 64 on its inner end and is formed with an axial extension 65 of substantial length extending rearwardly into the body of the master cylinder 2. The axial extension 65 works through a seal 66 housed in an annular groove in a ring 67 held in the body of the master cylinder 1 by means of a circlip 68, the ring 67 forming an abutment for the return spring 37.

The rear end of the extension 65 is spaced by a short distance from the adjacent end of the outer piston 29 of the second piston assembly 27. A strut or thrust member 69 is in engagement at opposite ends with the base of open-ended axially extending complementary recesses 71, 72 in the secondary piston 27 and in the extension 65 so that the main piston 62 is moved axially when a thrust is applied to the secondary piston 27.

A chamber 55 is defined between the rings 25 and 67 in the counterbore 23 of the power-operated master cylinder 2 and a portion of the bore of the hydrostatic master cylinder 1. The forward end of the secondary piston 29 and the rearward extension 65 of the main piston 62 project through the respective rings 25 and 67 into the chamber 55 with the strut 69 located between them in the chamber. That part of the secondary piston 29 which passes through the ring 25 and that part of the rearward extension 65 of the main piston 62 which passes through the ring 67 are both of the same diameter so that the volume of the chamber 55 remains unchanged when the pistons 29 and 62 move. Further the chamber 55 is vented to the atmosphere through a radial port 56 in the wall of the body 4 of the power operated master cylinder. The vent port 56 also acts as a drain hole to allow any fluid leaking into chamber 55 from either master cylinder to escape.

The main piston 62 has a forward extension 73 of reduced diameter having a central threaded bore 74 in which is screwed the free end of a shank 75 of a bolt. The head 76 of the bolt is received within the closed end of a clip 77 of top-hat section having at its forward end a radial flange 78 providing an abutment for a compression spring 79 acting on the main piston 62 through a plate 81 surrounding the forward extension 73. The radial flange 78 engages with the adjacent end of the secondary piston 63 which is normally held in the position shown in the drawings by the force in a compression spring 82 acting between the forward end of the floating piston 63 and the closed end of the cylinder bore.

The floating piston 63 is provided at its forward end with a seal 83 and at the end adjacent to the main piston 62 with a pair of axially spaced seals 84 and 85.

A pressure space 86 between the pistons is adapted to be connected through a port 87 in the cylinder wall to the slave cylinders of one brake circuit, for example to the brakes on the front or rear wheels of a vehicle, and a pressure space 88 between the floating piston 63 and the closed end of the bore 61 is adapted to be connected, through a further radial port 89 to the space cylinders of a further brake circuit, for example to the brakes on the other wheels of the vehicle.

In the off position of brake communication between the pressure space 86 and a reservoir for hydraulic fluid (not shown) is established through a radial port 91 in the cylinder wall, and communication between the pressure space 88 and the same or another reservoir is established through a further radial port 92 in the cylinder wall.

When a pedal connected to the piston 6 is depressed to apply the brakes with the high pressure source operative, the piston 6 and the imperforate rod 9 are moved forwardly through a small distance. Due to the force in the compression spring 18, the cage assembly 13 is moved with the rod 9 through a corresponding distance and the shroud 16 moves out of contact with the tilting valve 43 controlling communication between the reservoir for the high pressure source and the first pressure space 39 to allow this tilting valve 43 to close. Thereafter a small additional forward movement of the cage assembly 13 opens the other tilting valve 48, by the engagement of its stem 53 with the inner free end of the shroud 16, to permit fluid from the high pressure source to enter the pressure space 39. In this position the nose portion 12 at the free end of the rod 9 is spaced by a small distance from the annular sealing ring 34 in the inner piston 31 of the secondary piston assembly 27. Simultaneously the high pressure fluid acts on the rear end of the outer piston 29 to advance the piston assembly 27 in the bore, and this pressure also pressurises the chamber within the inner piston 31, due to the assistance of the compression spring 35 moves the inner piston 31 towards the rod 9 to hold it in engagement with the rigid clip 36.

The movement of the secondary piston assembly 27 is transmitted through the member or strut 69 to advance the main piston 62 in the bore 61 of the master cylinder 1. When this occurs the seal 64 first closes the port 91 to cut off communication between the pressure space 86 and the reservoir, and applies pressure to the fluid in the pressure space 86 to apply the brakes of the first brake circuit. At the same time the main piston 62 through the spring 79 and the pressurised fluid in the pressure space 86, advances the floating piston 63 in the bore so that the seal 83 first closes the port 92 and thereafter applies pressure to the fluid in the pressure space 88 to apply the brakes of the other brake circuit.

In the event of failure of the high pressure source or the pressure space 39 when the brakes are being applied, the nose portion 12 of the imperforate rod 9 is spaced by a small distance from the annular sealing ring 34. In this position the cage assembly 13 is prevented from advancing further in the bore by the engagement of the shroud 16, with the stem 53 of the tilting valve 48 which acts as a stop. Further movement of the pedal causes the rod 9 to slide through the flange 14 and take up the small clearance between the rod 9 and the sealing ring 34 so that the nose portion 12 enters and seals with the sealing ring 34. The column of fluid in the inner piston 31, which is sealed between the rod 9 and the seal 34, forms a substantially incompressible strut whereby further movement of the rod 9 to advance the inner piston 31 causes the outer piston 29 to be advanced with it and advance the main piston.

The length of the column of hydraulic fluid within the inner piston 31 is regulated substantially in accordance with the distance by which the outer piston 29 has been advanced in the bore relative to the inner piston. The provision of this hydraulic column ensures that the imperforate rod 9 is moved only a minimum distance to effect direct engagement with, and operation of, the secondary piston assembly 27 in the event of failure of the high pressure source or pressure space 39 or its associated primary brake system.

In a modification (not illustrated) of the construction described and illustrated above the thrust member or strut 69 may be omitted and the rearward extension 65 of the main piston 62 may be combined as a single integral assembly with the outer piston of the secondary piston assembly 27. In this construction the high pressure fluid in the pressure space 39 acts on the main piston 62 through the inner piston 31 when the brake is applied.

Another modification is illustrated in FIG. 2 in which those parts corresponding to parts of the construction described above with reference to FIG. 1 have corresponding reference numerals qualified by the suffix 'a'. The construction of the body 4a of the power-operated master cylinder 2a, the first piston 6a and the tilting valves 43a and 48a are substantially as described above with reference to FIG. 1.

An annular ring 100 formed integrally with a sleeve 101 is fitted in the counterbore 23a of the body 4a of the master cylinder and are retained therein by a retaining nut 102 screwed into the forward end of the body. The retaining nut 102 abuts the ring 100 and the sleeve 101 is located between the ring 100 and the shoulder 24a.

A secondary piston 27a in the form of a telescopic assembly is slidably received in the central opening of the ring 100. The secondary piston 27a comprises an outer piston 29a in which works an inner piston 31a. The body of the outer piston is in the form of a hollow sleeve provided at its forward end with an end closure 103 and a recessed extension 104. At its outer end the outer piston has an external radial flange having a diameter complementary to that of the sleeve 101 so that the flange is slidable in the sleeve while the body of the outer piston is slidable in the central opening of the ring 100. A plurality of ports 106 is formed in the flange 105 on a pitch circle of a diameter slightly greater than that of the external diameter of the body of the outer piston. A bleed hole 107 is also provided in the flange 105 radially disposed outside the pitch circle of the ports 106. An annular valve member 108 slidably fitted on the exterior of the outer piston 29a is adapted to seal off the ports 106 at the forward face of the flange 105 leaving the bleed hole 107 open and is retained in a position close to the forward face of the flange by a circlip 109 fitted round the piston.

The inner piston 31a is hollow, being provided at its outer end with an end closure flange 32a having a central opening 33a aligned with, and of a diameter slightly greater than, that of the nose portion 12a at the inner end of the rod 9a. The outer diameter of the flange 32a is greater than the diameter of the inner piston but smaller than the pitch circle on which the ports 106 are positioned.

Movement of the pistons 29a, 31a relatively away from each other is normally prevented by a rigid, perforated, annular clip 110 engaging with the inner piston 31a and clamped between the sleeve 101 and the step 24a, and a compression return spring (not shown) urging the outer piston 29a towards the rod 9a and acting on the recessed forward end of the outer piston 29a.

A chamber 111 is thus formed between the sleeve 101 and the outer piston 29a bounded at opposite ends by the ring 100 and the flange 105. Fluid can flow freely into the chamber 111 through the ports 106 but outflow is restricted by the valve member 108 and bleed hole 107. Hence, when high pressure fluid is admitted by way of the valve 48a into the pressure chamber 39a, the rate of forward movement of the outer piston is controlled at a predetermined value dependent on the size of the bleed hole 107. This protects the master cylinder assembly from excessive rates of pressure build up which may after a period of service result in damage to some components of the assembly.

I claim:

1. A master cylinder assembly for an hydraulic braking system comprising a master cylinder having a bore, an end closure for said bore, and a main piston working in said bore and having a recess in its end remote from said end closure, a portion of said bore between said end closure and said piston defining a first pressure space, an hydraulic motor having a bore, a pedal-operated piston working in said bore of the hydraulic motor, a secondary piston working in said bore of the hydraulic motor disposed between said pedal-operated piston and said piston in the master cylinder and having a recess in its end adjacent to said piston in the master cylinder, a portion of said bores of the hydraulic motor between said pedal-operated piston and said secondary piston defining a second pressure space, and a normally closed valve in communication with said second pressure space, said valve being operable by operation of said pedal-operated piston for the admittance of fluid under pressure from a high pressure source to said second pressure space, portions of said bores in the master cylinder and the hydraulic motor between said piston in the master cylinder and said secondary piston in the hydraulic motor defining a chamber which is of constant colume and vented to the atmosphere, a strut extending through said constant volume chamber between said secondary piston in the hydraulic motor and said piston in the master cylinder and rockably located in said recesses formed in said pistons, and a spring mounted in said vented chamber surrounding said strut and operative to urge said secondary piston in the hydraulic motor in a direction away from the master cylinder.

2. A master cylinder assembly as claimed in claim 1, wherein said master cylinder is a hydrostatic tandem master cylinder in said bore of which works a floating piston located between said end closure and said main piston of said master cylinder.

3. A master cylinder assembly in accordance with claim 1 wherein a first fixed wall is provided in the bore of the master cylinder on the side of said piston in said master cylinder facing said secondary piston in the hydraulic motor and a second fixed wall is provided in the bore of the hydraulic motor, on the side of said secondary piston facing said piston in the master cylinder, said fixed volume chamber being defined between said first fixed wall and said second fixed wall.

4. A master cylinder assembly in accordance with claim 3 wherein said first fixed wall has an aperture and said piston in the master cylinder comprises a main section and an extension, said extension projecting through said aperture and being sealingly slidable therein, and said second fixed wall has an aperture and said secondary piston in the hydraulic motor comprises a main section and an extension, said extension being of the same cross-sectional area as said extension of said piston in the master cylinder and projecting through said aperture and being sealingly slidable therein, said recesses being formed in said extensions and said spring surrounding said extensions.

5. A master cylinder assembly for an hyraulic braking system comprising a master cylinder having a bore, an end closure for said bore, and a main piston working in said bore, a portion of said bore between said end closure and said piston defining a first pressure space, in combination with an hydraulic motor having a bore, a pedal-operated piston working in said bore of the, hydraulic motor, a portion of said bore of the hydraulic motor on the side of the pedal-operated piston facing the piston in the master cylinder defining a second pressure space, a normally closed valve in communication with said pressure space, said valve being operable by operation of said pedal-operated piston for the admittance of fluid under pressure from a high pressure source to said second pressure space and a secondary piston working in said bore of said hydraulic motor between said pedal-operated piston and said piston in said master cylinder, said secondary piston forming a wall of a chamber having volume varying with movement of said secondary piston, said chamber being in communication with said second pressure space, and means operative to control the flow of fluid between said chamber and said second pressure space to restrict the rate of movement of said secondary piston in a direction towards said piston in said master cylinder.

6. A master cylinder assembly as claimed in claim 5, wherein there is a member located in and fixed relative to said hydraulic motor, and the portion of said bore of said master cylinder between said secondary piston and said member defines said variable volume chamber.

7. A master cylinder assembly as claimed in claim 6, wherein said secondary piston comprises a body of cylindrical shape of a diameter less than the diameter of said bore of said hydraulic motor, and a radial flange formed at one end of said body with an outer diameter complementary to the diameter of said bore of said second master cylinder, said flange being slidably fitted in said bore of said hydraulic motor and having a bleed hole and at least one port provided with one-way valve means operative to permit free flow of fluid into said chamber, and said fixed member comprises an annular member having a central opening in which the end of said secondary piston remote from said flange is slidably fitted.

* * * * *